United States Patent
Basu Mallick et al.

(10) Patent No.: US 11,006,350 B2
(45) Date of Patent: *May 11, 2021

(54) METHOD AND APPARATUS FOR SIGNALING OF SYSTEM INFORMATION

(71) Applicant: Motorola Mobility LLC, Chicago, IL (US)

(72) Inventors: Prateek Basu Mallick, Langen (DE); Joachim Lohr, Wiesbaden (DE); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,165

(22) Filed: Dec. 20, 2019

(65) Prior Publication Data

US 2020/0128475 A1 Apr. 23, 2020

Related U.S. Application Data

(63) Continuation of application No. 15/970,611, filed on May 3, 2018, now Pat. No. 10,548,065.

(60) Provisional application No. 62/502,445, filed on May 5, 2017.

(51) Int. Cl.
| | | |
|---|---|---|
| *G01R 31/08* | (2020.01) |
| *H04W 48/10* | (2009.01) |
| *H04W 72/12* | (2009.01) |
| *H04W 4/06* | (2009.01) |
| *H04W 48/14* | (2009.01) |
| *H04W 48/12* | (2009.01) |

(52) U.S. Cl.
CPC ............ *H04W 48/10* (2013.01); *H04W 4/06* (2013.01); *H04W 48/12* (2013.01); *H04W 48/14* (2013.01); *H04W 72/1278* (2013.01)

(58) Field of Classification Search
None
See application file for complete search history.

(56) References Cited

U.S. PATENT DOCUMENTS

| | | | | |
|---|---|---|---|---|
| 10,517,069 B2* | 12/2019 | Basu Mallick | ... | H04W 72/1289 |
| 2014/0119261 A1* | 5/2014 | Wang | ................ | H04W 72/0446 370/312 |
| 2017/0105166 A1* | 4/2017 | Lee | ..................... | H04W 68/005 |

(Continued)

*Primary Examiner* — Gerald A Smarth
(74) *Attorney, Agent, or Firm* — Loppnow & Chapa; Matthew C. Loppnow

(57) ABSTRACT

Minimum system information including at least cell access information to establish access with a cell can be transmitted, the minimum system information also including at least one indication indicating whether particular system information listed in scheduling information in the minimum system information is being broadcasted or not being broadcasted. A system information request message requesting transmission of non-minimum system information if the at least one indication indicates the non-minimum system information is not being broadcasted can be received, where the non-minimum system information may not be included in the minimum system information. The non-minimum system information can be transmitted either in response to the receiving of the system information request message or in response to the at least one indication indicating whether particular system information is being broadcasted.

16 Claims, 10 Drawing Sheets

(56) References Cited

U.S. PATENT DOCUMENTS

| | | | |
|---|---|---|---|
| 2018/0242114 A1* | 8/2018 | Hoglund | H04L 1/1614 |
| 2018/0302843 A1* | 10/2018 | Frenger | H04W 48/10 |
| 2019/0159110 A1* | 5/2019 | Takahashi | H04W 48/10 |
| 2020/0053797 A1* | 2/2020 | Basu Mallick | H04W 74/0833 |
| 2020/0068477 A1* | 2/2020 | Awada | H04W 48/08 |

* cited by examiner

```
RequestedSIBTypeList-r10 ::= SEQUENCE (SIZE (1..maxSIBs)) OF SIB-Type
sib-Type ::=      ENUMERATED {
                  sibType3, sibType4, sibType5, sibType6,
                  sibType7, sibType8, sibType9, sibType10,
                  sibType11, sibType12, sibType13, ..., sibType30}
```

*FIG. 4*

METHOD AND APPARATUS FOR SIGNALING OF SYSTEM INFORMATION

BACKGROUND

1. Field

The present disclosure is directed to a method and apparatus for signaling on a wireless network. More particularly, the present disclosure is directed a method and apparatus for signaling of system information on a wireless wide area network.

2. Introduction

Presently, 5th generation New Radio (NR) wireless systems, abbreviated 5G NR, offer improved wireless network technologies. 5G NR includes such technologies as millimeter wave bands, such as 26, 28, 38, and 60 GHz and can offer theoretical throughput as high as 20 gigabits per second, with median bandwidth being approximately 3.5 gigabits. 5G NR can utilize Multiple Input Multiple Output (MIMO), for example 64-256 antennas, to provide up to ten times the performance of $4^{th}$ generation (4G) networks. To achieve such higher throughput, 5G NR aims to reduce signaling overhead. One such reduction occurs during initial interaction between a wireless device and a network entity within a cell. In order to reduce the signaling overhead for the provisioning of System Information (SI), the concept of so-called "minimum System Information" has been introduced for NR. The minimum System Information (SI) can contain basic information for initial access to the cell.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 4 is an example signaling structure for requesting SIBs, such as a SIB or SI request, according to a possible embodiment;

DETAILED DESCRIPTION

Embodiments provide a method and apparatus for signaling of system information. According to a possible embodiment, minimum system information including at least cell access information to establish access with a cell can be received, the minimum system information also including at least one indication indicating whether particular system information listed in scheduling information in the minimum system information is being broadcasted or not being broadcasted. A system information request message requesting transmission of non-minimum system information if the at least one indication indicates the non-minimum system information is not being broadcasted can be transmitted, where the non-minimum system information is not included in the minimum system information. The non-minimum system information either in response to the transmitting of the system information request message or in response to the at least one indication indicating whether particular system information is being broadcasted can be received.

Figure 1:
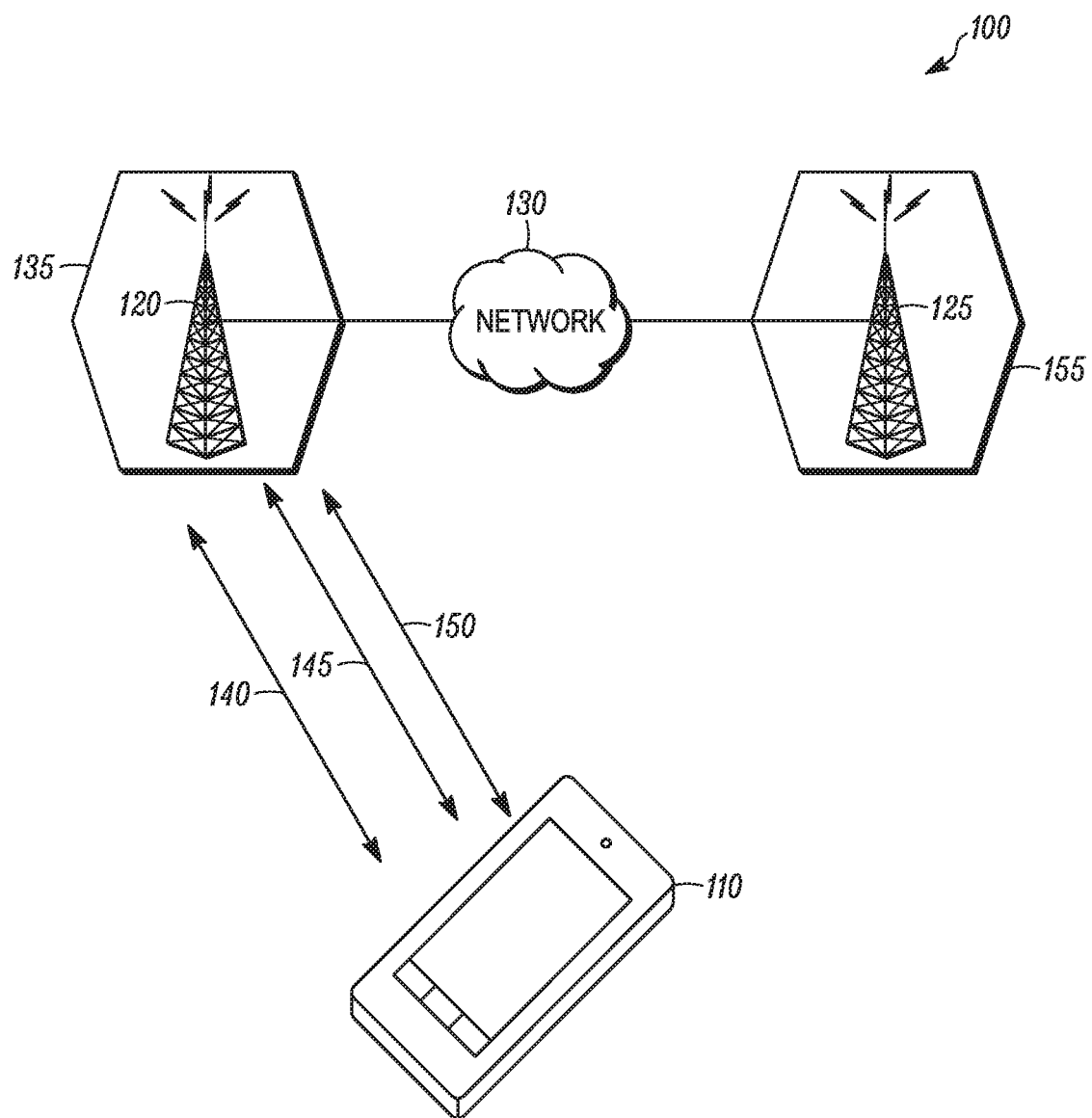
FIG. 1 is an example block diagram of a system, according to a possible embodiment.

FIG. 1 is an example block diagram of a system 100, according to a possible embodiment. The system 100 can include a User Equipment (UE) 110, at least one of network entities 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one of network entities 120 and 125 can be wireless wide area network base stations, can be NodeBs, can be enhanced NodeBs (eNBs), can be New Radio NodeBs (gNBs), such as 5G NodeBs, can be unlicensed network base stations, can be access points, can be base station controllers, can be network controllers, can be Transmission/Reception Points (TRPs), can be different types of base stations from each other, and/or can be any other network entities that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks. In a possible embodiment, the network entity 120 and the UE 110 can be included in a cell 135, the network entity 125 can be included in another cell 155, and the network entities 120 and 125 can be coupled via the network 130.

In operation, the UE 110 can communicate with the network 130 via the network entity 120. For example, the UE 110 can send and receive control signals on a control channel and user data signals on a data channel.

The system 100 can reduce the signaling load for the provisioning of System Information, the concept of so-called "minimum System Information" which has been introduced for New Radio (NR). The minimum System Information (SI) 140 can contain basic information for initial access to the cell 135 and can include such information as Management Information Base (MIB) and can include SIB1 information, such as Subframe Number (SFN), list of Public Land Mobile Network (PLMN), cell camping parameters, and Random Access Channel (RACH) parameters. The minimum SI 140 can be broadcast periodically in the cell 135, whereas other "non-minimum" SI 150 does not necessarily need to be periodically broadcast, and the network 130 can decide whether such information is to be periodically broadcast. To obtain the non-minimum SI 150, the UE 110 can transmit an SI request message 145 to the network 130, via the network entity 120, to request the non-minimum SI 150. The network 130 can transmit, via the network entity 120, the non-minimum SI 150 to the UE 110. The non-minimum SI 150 can be provided on-demand to the UE 110, that is the UE 110 can request the non-minimum SI 150 via the SI request message 145. Delivery of the non-minimum SI 150 can also be done by broadcast or unicast manner. The minimum SI 140 can include system information scheduling information and can indicate whether a specific system information, such as an SI block (SIB) that can be periodically broadcasted or provided on-demand. The non-minimum SI 150 can include multiple SIBs. The particular system information (not SI) can be broadcast at least in a SIB and can also be broadcast in an SI message including at least one SIB. For example, one SI message can include one or more SIBs. The system information can be provided in a SIB or other system information message, such as a message that includes at least one SIB.

In order to obtain the one or more SIBs which are not periodically broadcasted and are provided on-demand, UE 110 can initiate an on-demand SI acquisition procedure. For SI required by the UE 110, the UE 110 can know whether it is available in the cell 135 and whether the SI is broadcast or not before the UE 110 can send the SI request message 145, that is the UE 110 can first acquire the minimum SI 140. Scheduling information for other SI can be provided by the minimum SI 140, such as in a SIB1, can include SIB type, validity information, periodicity, and an SI-window information. The UE 110 in idle and an inactive state can transmit the SI request message 145 requesting the non-minimum SI 150 without state transition using an MSG1 and/or MSG3-based approach. For a connected UE 110, dedicated Radio Resource Control (RRC) signaling can be used for the SI request message 145 and delivery of the non-minimum SI 150. In an example, the UE 110 can transmit the SI request message 145 in physical layer Random Access Preamble (RAP), in a Medium Access Control (MAC), or in an RRC message, for example as an MSG1 and/or MSG3, such as when the UE 110 is in the idle state, or when the UE 110 is in the connected state.

MSG1 based signaling can rely on association between one or more reserved preambles and a corresponding set(s) of SIB(s). To request multiple SIB(s) belonging to a different set, the UE 110 can transmit/initiate corresponding MSG1 transmissions.

The system 100 can provide a signaling-structure for requesting SIBs using an MSG3 and dedicated signaling. A poorly designed signaling-structure can run a risk of misinterpretation if certain SIBs' scheduling changes in-between the UE 110 transmission and the network 130 reception of the signaling-structure requesting the SIBs. This may not only delay the acquisition of certain SIB(s) in the UE 110 but also the network 130 can unnecessarily broadcast certain SIB(s) that were actually not even requested. Another fallout of a poorly designed signaling-structure could be that the signaling-structure itself is quite inefficient/big and thereby result in a reduction of chances of a quick and successful transmission.

Figure 2:
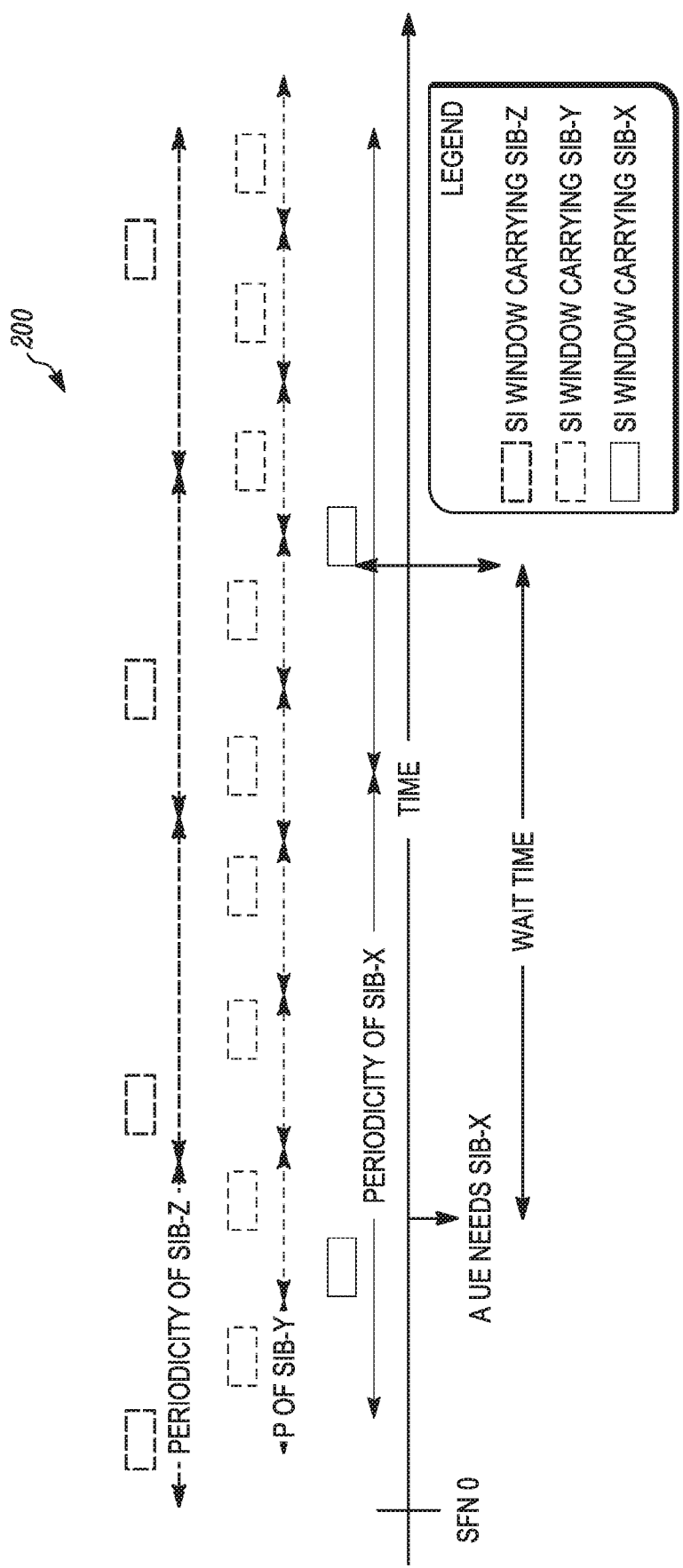
FIG. 2 is an example scenario showing transmission of SI messages, according to a possible embodiment.

FIG. 2 is an example scenario 200 showing transmission of SI messages, according to a possible embodiment. In LTE, system information except MIB and SIB1 can be transmitted in so called SI messages. The SI messages can be transmitted within periodically occurring time domain windows, which can be referred to as SI-windows, using dynamic scheduling. Each SI message can be associated with an SI-window and the SI-windows of different SI messages may not overlap. That is, within one SI-window only the corresponding SI can be transmitted. The length of the SI-window can be common for all SI messages and can be configurable. Within the SI-window, the corresponding SI message can be transmitted a number of times. The UE 110 can acquire detailed time-domain scheduling, and can acquire other information, e.g. frequency-domain scheduling, used transport format, from decoding SI-Radio Network Temporary Identifier (RNTI) on a Physical Downlink Control Channel (PDCCH).

Further, in NR the scheduling information for SI can be provided by the minimum SI 140, such as in SIB1, and may include SIB type, validity information, periodicity, SI-window information and an indication whether the particular SIB-type is broadcasted or not. Though the embodiments reference a SIB, the actual network may provide them in SI-messages, such as in LTE. Two schemes can be available as follows:

Scheme-1: Only one indication, such as a Boolean Flag, can be used to indicate if a particular SIB is being broadcasted by the cell 135 "now" or not. By "now", the UE 110 has some time/possibility to acquire the particular SIB after having received the Boolean Flag. If the UE 110 interested in the particular SIB sees from the Boolean Flag that the SIB is not broadcasted now, then the UE 110 can request, via the SI request message 145, the particular SIB from the network 130.

Scheme-2: This scheme can use two indications, such as two Boolean flags. The first of these two flags can indicate that the particular SIB is "regularly broadcasted" or provided "on-demand". The second flag in the Scheme-2 can have the same meaning as the Boolean Flag in Scheme-1 but can be applicable only to the on-demand SIBs as indicated by the first Flag of Scheme-2.

Figure 3:
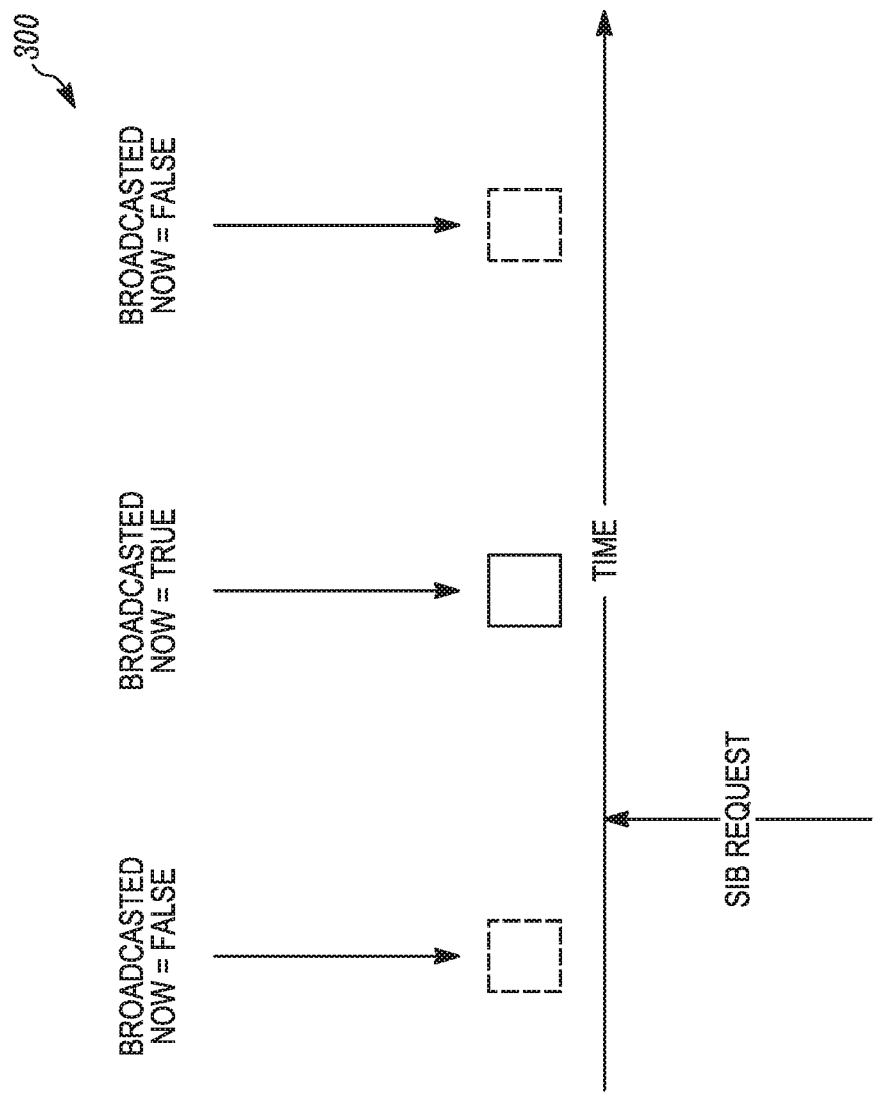
FIG. 3 is an example scenario showing toggling of a "Broadcast Now" Boolean Flag, according to a possible embodiment.

FIG. 3 is an example scenario 300 showing toggling of a "Broadcast Now" Boolean Flag, according to a possible embodiment. The network 130 can toggle the "Broadcasted now" flag in any schemes, such as Scheme-1 and/or Scheme-2, upon receiving the SI request message 145 from the UE 110 to provide the SIB to indicate that the SIB is subsequently provided/broadcasted (e.g. Broadcasted Now=True). The network 130 can toggle the Boolean Flag back when the network 130 has provided/broadcasted the SIB for a sufficiently long time, for example until an end of a current modification period as described by 3GPP TS 36.331-e30 section 5.2.1.3, such as by resetting the Broadcasted Now flag to False. In a possible embodiment, an indication can be used to indicate if a SIB or SI message is being broadcasted now in the current modification period. If the indication indicates that a particular SIB/SI message is broadcasted now, the network shall broadcast that SIB/SI until the end of the current modification period and the UE 110 thereby can have opportunities until the end of current modification period to acquire the SIB/SI. In an example embodiment, one indicator in SIB1 can indicate whether an SI message is currently being broadcast or not. The indication shall be valid until an end of the current modification period. For example, the network 130 can guarantee to the UE 110 that when a particular non-minimum SI is indicated as being broadcasted, the particular non-minimum SI 150 can be broadcasted until an end of the current modification period in which it is indicated as being broadcasted.

FIG. 4 is an example signaling structure 400 for requesting SIBs, such as a SIB or SI request, according to a possible embodiment. For a first solution, the UE 110 can request SIBs by listing each SIB-type separately, such as illustrated in signaling solution 400. The system information can comprise a system information message, where the system information request message can comprise a list of one or more of a unique system information message for the requested non-minimum system information, such as the list illustrated in the signaling structure 400. According to a possible embodiment, the SI request message 145 can include this signaling solution 400. For example, if the maximum number of SIBs is 30, but even if the UE 110 is requesting only 10 SIBs, the UE 110 would need to use 10*5=50 Bits (2^=32). For example, the number of bits needed within the SI request message 145 for non-minimum SI 150 can be the number of requested SIBs multiplied by 5 due to the fact that 2^5=32 bits that are necessary to indicate each of the maximum number of 30 SIBs.

According to another possible embodiment, another signaling structure that can be included within the SI request message 145 for non-minimum SI 150, such as a SIB or SI request can include use of a BITMAP. The UE 110 can send the SI request message 145 that includes the BITMAP to the network 130.

In an example embodiment, bits in the BITMAP can represent either SIBs or SI messages. In a possible implementation, the bits of the BITMAP can represent SI messages and these bits can be the SI messages indicated in the scheduling information in SIB1 of the current cell. The UE 110 can determine the SI message(s) based for the SIB(s) that it needs based on the corresponding scheduling information in SIB1.

In another example implementation, the bits of the BITMAP can represent SIBs, sequentially. In this example embodiment, no indication is required in a broadcast message to indicate whether the other/non-minimum SIBs are provided via periodic broadcast basis or only on-demand basis. In this case, bits in the BITMAP represent SIBs sequentially starting with a first bit for the first SIB that is carried in SI Messages, such as SIB2, a second bit for the second SIB that is carried next in the same or next SI messages, such as SIB3, and so on.

In another example implementation, the bits of the BITMAP can represent SIBs, sequentially, where the SIBs as numbered in the 3GPP specification 38.331 of future versions. As an example of this embodiment, if there are total 25 SIBs in NR, then BIT1 of the BITMAP can represent SIB2, BIT2 of the BITMAP can represent SIB3 . . . , BIT24 of the BITMAP can represent SIB25.

In a further example embodiment, bits in the BITMAP can represent SIBs sequentially starting with a first bit for a first SIB that can be indicated as being provided on on-demand basis in the current cell, then a second bit for a second SIB that can be indicated as being provided on on-demand basis in the cell 135, and so on. A length of the BITMAP can be set to a maximum number of specified SIBs or to the number of SI messages broadcasted in the cell 135.

For example, the BITMAP can be a same length as number of SIBs defined in NR, can be a same length as number of SIBs supported in the cell 135, can be the number of SI messages broadcasted in the cell 135 or can be a longer value, such as 40 bits to account for future SIBs and/or SI messages. If the BITMAP is 40 bits but we only have a total of 25 SIBs in NR or 25 SI messages broadcasted in the cell, then BIT1 of the BITMAP represents SIB2/SI message1, BIT2 of the BITMAP represents SIB3/SI message2 . . . , BIT24 of the BITMAP represents SIB25/SI message24. The remaining bits, if any in the BITMAP, such as BIT25 to BIT40 in a 40-bit BITMAP, can be set to '0' or '1' by the UE 110 and can be ignored by the network entity 120 in any of the embodiments.

According to another possible embodiment, the network 130 may configure the length of the BITMAP based on the SIB-types the network 130 can broadcast. In addition to these, the BITMAP length may have provision for some additional bits for future use. One bit in the BITMAP can correspond to one SIB request. The BITMAP may be interpreted by the network 130 from the left to right, or right to left, such that the first bit in the BITMAP can correspond to the lowest SIB-type being requested, a next bit in the BITMAP can correspond to a next higher SIB-type being requested, and so on. In another possible embodiment, the BITMAP may be interpreted by the network 130 from the left to right, or right to left, such that the first bit in the BITMAP can correspond to the highest SIB-type being requested, a next bit in the BITMAP can correspond to a next lower SIB-type being requested, and so on. With these principles in mind, the following three sub-solutions can be implemented by the network 130.

BITMAP-Solution A: One bit can be included within the BITMAP for each SI-message irrespective of if particular SI messages are "regularly" broadcasted or transmitted on-demand by the network 130.

BITMAP-Solution B: One bit can be included within the BITMAP only for each of those SI-messages that are indicated as to be provided on-demand, for example statically, such as irrespective of if these SI-messages are being provided/broadcasted at a moment by the network 130.

BITMAP-Solution C: One bit can be included within the BITMAP only for each of those SI-messages that are indicated as to be provided on-demand by the network 130 but are NOT being provided/broadcasted at the moment, such as dynamic toggling of bits, by the network 130.

The following tables can be used for Scheme-1 and Scheme-2.

TABLE 1

Scheme-1

| | First-Bit: Broadcasted Now: time-instant T1 | First-Bit: Broadcasted Now: time-instant T2 |
|---|---|---|
| SIB1 | Broadcasted Now | Broadcasted Now |
| SIB2 | Not Broadcasted Now | Broadcasted Now |
| SIB3 | Not Broadcasted Now | Not Broadcasted Now |
| SIB4 | Broadcasted Now | Not Broadcasted Now |

TABLE 2

Scheme 1 Using only 1 bit: Broadcasted Now (Yes or No)

| | | |
|---|---|---|
| BITMAP-Solution A | Can use 4 bits but not request the SIBs that are broadcasted now | Interpretation at T2 is unchanged. If the UE could not acquire SIB4 before the network stopped Broadcasting it, the UE can request again |
| BITMAP-Solution B | Not - applicable | Not-applicable |
| BITMAP-Solution C | Can use 2 bits and request the SIBs that this UE needs. Bit 1 can represent SIB2, Bit 2 can represent SIB3 | Interpretation at T2 can be changed |

TABLE 3

Scheme-2

| | First-Bit | Second-Bit: @time-instant T1 | Second-Bit: @time-instant T2 |
|---|---|---|---|
| SIB1 | Broadcasted Regularly | — | — |
| SIB2 | On-demand | Not Broadcasted Now | Broadcasted Now |
| SIB3 | On-demand | Not Broadcasted Now | Not Broadcasted Now |
| SIB4 | On-demand | Broadcasted Now | Not Broadcasted Now |

TABLE 4

Scheme 2 using 2 bits
First-bit (Regularly Broadcasted or On-Demand)
Second-Bit: Broadcasted Now (Y or No)

| | | |
|---|---|---|
| BITMAP-Solution A | Can use 4 bits but the UE may not request the SIBs that are "Regularly Broadcasted" OR SIBs that are "Broadcasted Now" | Interpretation at T2 is unchanged. If the UE could not acquire SIB4 before the network stopped Broadcasting it, the UE can request again |
| BITMAP-Solution B | Can use 3 bits (for 3 On-demand SIBs) but may only request SIB2 (Bit-1) and SIB3 (Bit-2) | Interpretation at T2 can be unchanged. If the UE could not acquire SIB4 before the network stopped Broadcasting it, the UE can request again |
| BITMAP-Solution C | Can use only 2 bits (Bit-1 = SIB2; Bit-2 = SIB3) | Interpretation at T2 can be changed |

As can be seen from the above tables, the BITMAP-Solution A can avoid misinterpretation due to a time lag between initial transmission by the UE 110 and actual reception time at the network 130 after possibly more than 1 Hybrid Automatic Repeat Request. (HARQ) (re)transmissions and also can need only 1 Broadcast bit, for example, Scheme-1 is sufficient.

For example, 3GPP can specify SIB1 to SIB10. SIB2-SIB10 can be provided by the network 130 in SI messages from the 3GPP perspective. Out of these 9 SIBs, the cell 135 may only provide/support SIBs 2, 4, 6, 8 and 10. This means that SIBs 3, 5, 7, 9 may not be provided/supported by the cell 135. Therefore, in the scheduling info in SIB1 only SIBs 2, 4, 6, 8 and 10 are listed. Out of these, for example SIBs 2, 4 and 6 can be indicated as being broadcasted or guaranteed to be broadcasted until the current modification period boundary and SIBs 8 and 10 can be indicated as not being broadcasted, such as when the flag-indication for both these is FALSE. The UE 110 may only request SIB 8 and SIB 10. The UE 110 may not be allowed/supposed to request any of SIBs 3, 5, 7, 9.

For the network behavior associated with BITMAP-Solution A, the network 130 can regularly broadcast certain SIBs and the SI request message 145 can show these SIBs as "required". Then the SI request message 145 for such SIBs can be ignored by the network 130 since the network 130 may continue to regularly broadcast these SIBs. The on-demand SIBs including the non-minimum SI 150 that are not broadcasted can now be broadcasted subsequently.

For UE behavior associated with BITMAP-Solution A, the UE 110 can use a first 'N' bits in the BITMAP where N is the number of SIBs (or in practice the SI-message) indicated in the scheduling information. For SIBs that are indicated as "Broadcasted Now=true", the UE 110 can acquire the ones it needs. For other SIBs indicated as "Broadcasted Now=false", the UE 110 can determine which of these SIBs it needs and then set these bits to a predefined value, such as a true meaning requested, to indicate to the network 130 that these SIBs are requested. Upon confirmation/feedback from the network 130 that these SIBs are provided, the UE 110 can acquire them.

Figure 5:
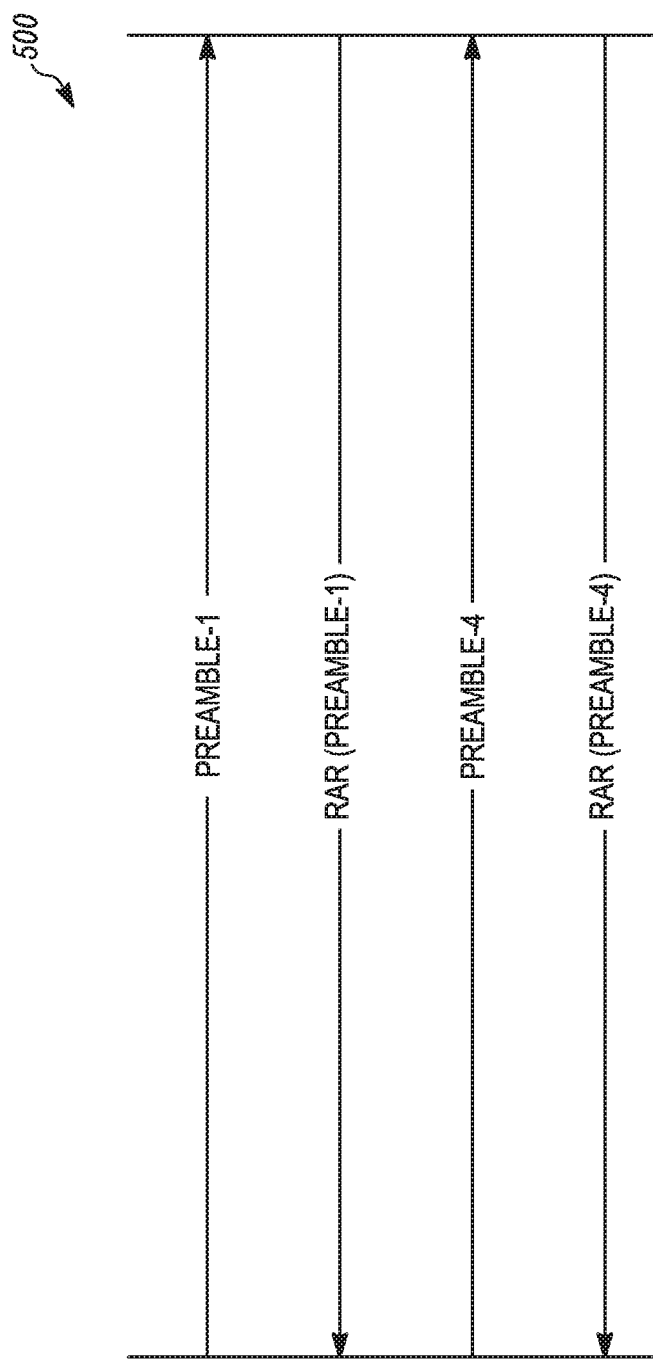
FIG. 5 is an example first option for a User Equipment (UE) to request its needed SIBs, according to a possible embodiment.

As an additional enhancement for the MSG1 based SI request message 145, if in a particular cell/network, SIBs A to H are provided on an on-demand basis and the network 130 configures four preambles to request the SIBs as follows:

Preamble 1=SIBs A, B
Preamble 2=SIBs C, D
Preamble 3=SIBs E, F
Preamble 4=SIBs G, H, then the UE 110 can determine that it needs SIBs A, B and H and can perform one of the following two options to request its needed SIBs:

FIG. 5 is an example first option 500 for a UE 110 to request its needed SIBs, according to a possible embodiment. The first option 500 includes transmission of one SI request message 145 at a time from the UE 110. The UE 110 can then look to receive a feedback message, such as a Random Access Response (RAR), to its request for non-minimum SI 150. One preamble can be used by the UE 110 for a group of SIBs, with no further optimization of the non-minimum SI 150.

Figure 6:
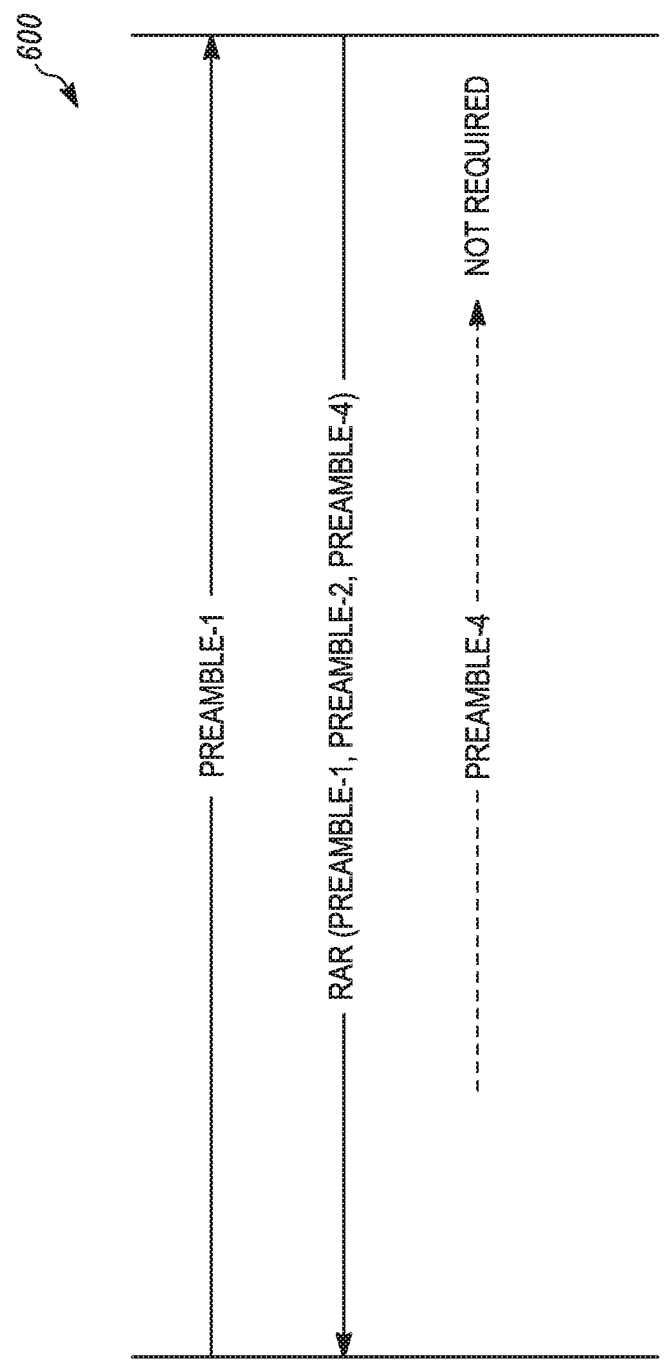
FIG. 6 is an example illustration of a second option for the UE to request its needed SIBs, according to a possible embodiment.

FIG. 6 is an example illustration of a second option 600 for a UE 110 to request its needed SIBs, according to a possible embodiment. In the second option 600 the feedback message, such as the RAR, is scheduled on one single common RNTI, such as a Random Access (RA)-RNTI, and carries a list of received preambles to indicate the corresponding SIBs that the network 130 is going to provide in response to possibly more than one requesting UE 110.

In the second option 600, the UE 110 need not send separate SI-requests/Preambles to request SI-messages grouped separately, saving uplink (UL) transmission/battery and optimizing UL interference/collisions. Moreover, the network 130 need not send a feedback/response to each of the requests, saving downlink (DL) transmission/resources. Furthermore, the second option 600 saves RNTIs space and further, RA-RNTI calculation may not be required. Also, compared against the MAC RAR, none of the fields in MAC RAR payload are required, that is none of timing advance command, UL grant, or temporary Cell (C)-RNTI. The system 100 can eliminate transmission of the MAC RAR and allows for DL signaling reduction.

The MSG2, that is feedback from MSG1, can consist of only Extension (E)/Type (T)/Random Access Preamble IDentitfier (RAPID) MAC sub-header and some of reserved Preambles, such as RAPIDs, that are configured by the network 130 to be associated with a corresponding MAC RAR. In one example, Preamble 4 (=SIBs G, H) can be configured by the network 130 to be associated with a corresponding MAC RAR and when the MAC sub-header has RAPID=Premable 4, then the UE 110 can further receive a MAC RAR, such as a Physical Downlink Shared Channel (PDSCH). This MAC RAR can contain part or whole of either/both SIBs G, H. The "part" could correspond to the new changes in that SIB compared to a previous transmitted version.

Additionally, instead of configuring some of the reserved Preamble for a MAC RAR reception, an explicit indication in the MAC sub-header itself can be used, such as a one-bit Boolean flag. This Boolean flag indicating if a MAC RAR is transmitted, signals the UE 110 to receive a corresponding MAC RAR, such as a PDSCH transmission. This MAC RAR can contain part or whole of the any one or more SIBs A to SIB H.

Figure 7:
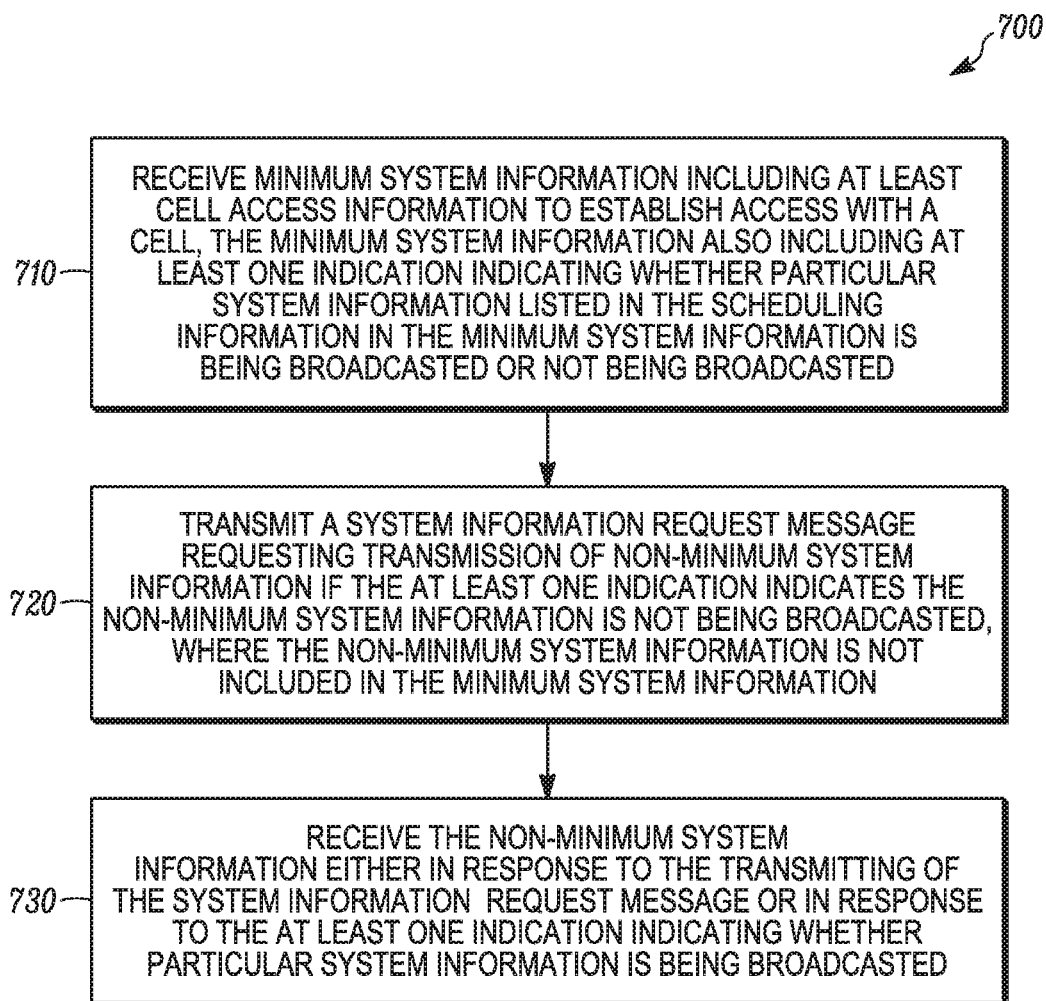
FIG. 7 is an example flowchart illustrating operation of an apparatus such as a wireless communication device, according to a possible embodiment.

FIG. 7 is an example flowchart 700 illustrating operation of an apparatus such as a wireless communication device, for example the UE 110, according to a possible embodiment. At 710, the minimum SI 140 including at least cell access information to establish access with a cell can be received. The minimum SI 140 can also include at least one indication indicating whether particular system information listed in scheduling information in the minimum SI 140 is being broadcasted or not being broadcasted. According to a possible embodiment, the at least one indication can be a Boolean flag. According to a possible embodiment, the at least one indication can include a first indication, where the minimum system information can further include a second indication indicating whether the particular system information listed in the scheduling information in the minimum system information is regularly broadcast or provided to the user equipment on-demand. Transmitting the system information request message can include transmitting the system information request message in response to the second indication indicating that the particular on-demand system information not being currently broadcast and the second indication indicating the particular system information is provided on-demand. According to a possible embodiment, the system information can include a system information message, where the system information request message can include a list of one or more of a unique system information message for the requested non-minimum system information.

In a possible embodiment, the SI request message 145 can include a BITMAP, where each bit in the BITMAP can each correspond to a unique system information message for the requested non-minimum system information. In a possible embodiment, each bit of the BITMAP can indicate a different system information message or a different system information block. In a possible embodiment, a leftmost bit of the BITMAP can correspond to a lowest valued unique system information message type requested, a rightmost bit of the BITMAP can correspond to a highest valued unique system information message type requested, and bits ordered from the leftmost bit to the rightmost bit can be ordered in accordance with increased valued minimum information requested. In a possible embodiment, each bit in the BITMAP can correspond to particular system information irrespective of if the particular system information is regularly broadcasted or on-demand. In a possible embodiment, each bit in the BITMAP can correspond to only particular system information that is indicated as being provided on-demand. In a possible embodiment, each bit in the BITMAP can correspond to only particular system information that is indicated as being provided on-demand and not being currently provided to the user equipment. In a possible embodiment, only selected bits of the BITMAP, where the selected bits indicate system information that is not being broadcast and required by the user equipment, can be set by the UE 110.

At 720, the SI request message 145 requesting transmission of the non-minimum SI 150 can be transmitted. According to a possible embodiment, this transmission can occur if the at least one indication indicates the non-minimum SI 150 is not being broadcasted, where the non-minimum SI 150 is not included in the minimum SI 140. At 730, the non-minimum SI 150 can be received either in response to the transmission of the SI request message 145 at 720 or in response to the at least one indication indicating whether particular SI is being broadcasted.

Figure 8:
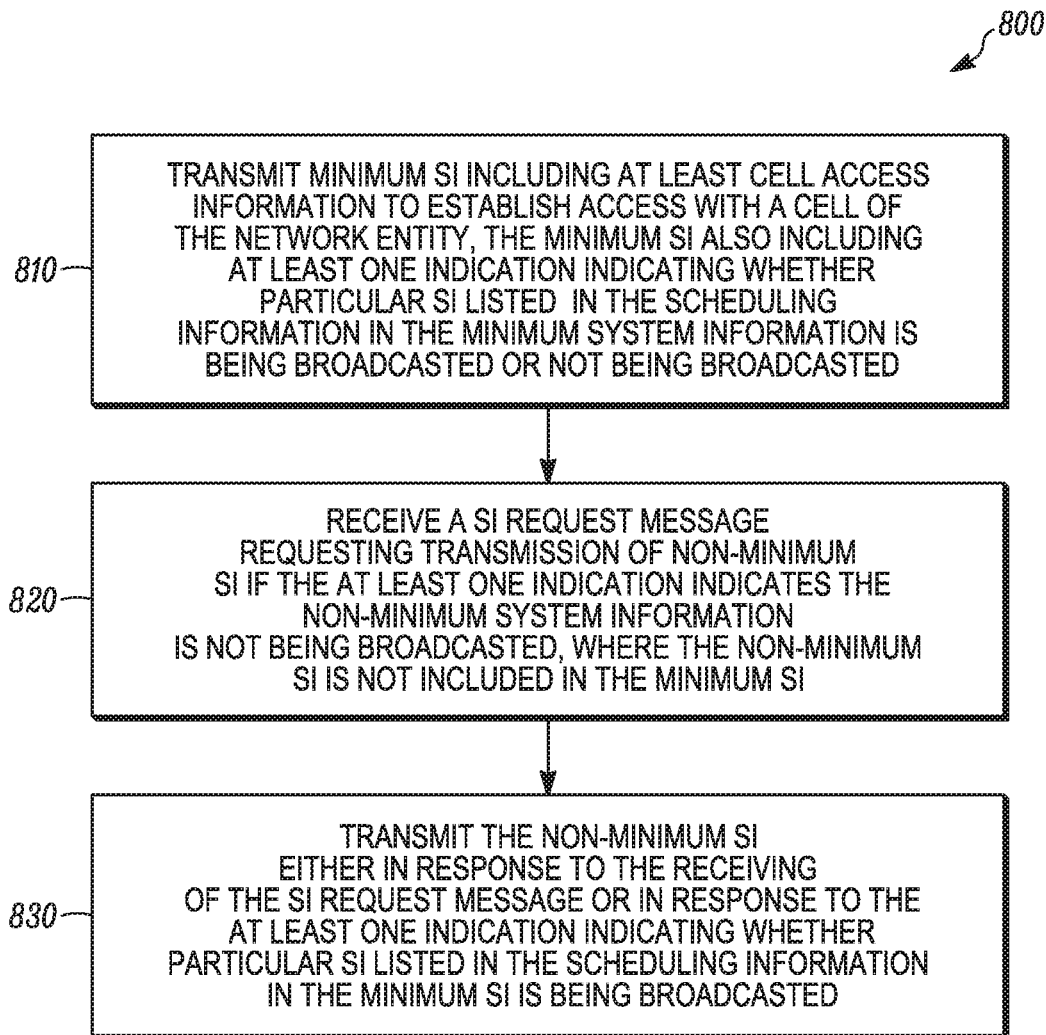
FIG. 8 is an example flowchart illustrating operation of an apparatus such as a network entity, according to a possible embodiment.

FIG. 8 is an example flowchart 800 illustrating operation of an apparatus such as a network entity, for example the network entity 120, according to a possible embodiment. At 810, the minimum SI 140 including at least cell access information to establish access with a cell can be transmitted. The minimum SI 140 can also include at least one indication indicating whether particular SI listed in the scheduling information in the minimum SI 140 is being broadcasted or not being broadcasted. According to a possible embodiment, the at least one indication can be a Boolean flag as described above and in 710. In a possible embodiment, the SI request message 145 can comprise a BITMAP, as described above and in element 710 above.

At 820, the SI request message 145 requesting transmission of the non-minimum SI 150 can be received. According to a possible implementation, this reception by the network entity 120 can occur if the at least one indication indicates the non-minimum SI 150 is not being broadcasted, where the non-minimum SI 150 is not included in the minimum SI 140.

At 830, the non-minimum SI 150 can be transmitted either in response to the receiving of the SI request message 145 at 820 or in response to the at least one indication indicating whether particular SI listed in the scheduling information in the minimum SI 140 is being broadcasted.

Figure 9:
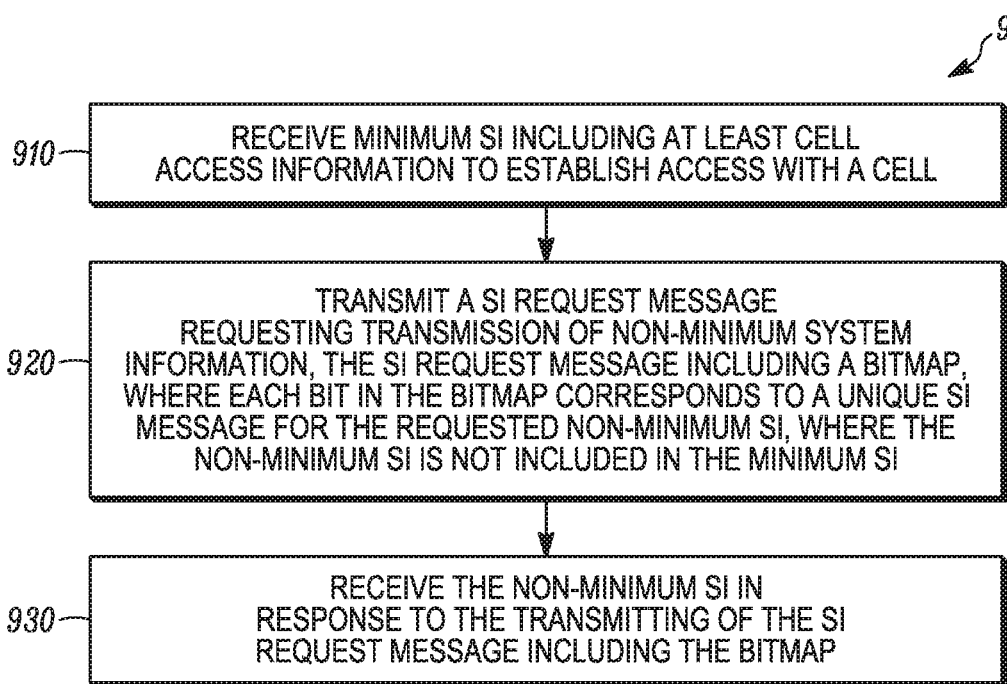
FIG. 9 is an example flowchart illustrating another operation of the wireless communication device, for example as the UE, according to a possible embodiment.

FIG. 9 is an example flowchart 900 illustrating another operation of the wireless communication device, for example the UE 110, according to a possible embodiment. At 910, the minimum SI 140 including at least cell access information to establish access with a cell can be received.

At 920, the SI request message 145 requesting transmission of the non-minimum SI 150 can be transmitted, where the SI request message 145 can include a BITMAP. According to a possible implementation, each bit in the BITMAP can correspond to a unique SI message for the requested non-minimum SI 150, where the non-minimum SI 150 is not included in the minimum SI 140. In a possible embodiment, the BITMAP can include the features described above and in 710.

At 930, the non-minimum SI 150 can be received in response to the transmission of the SI request message including the BITMAP at 920.

Figure 10:
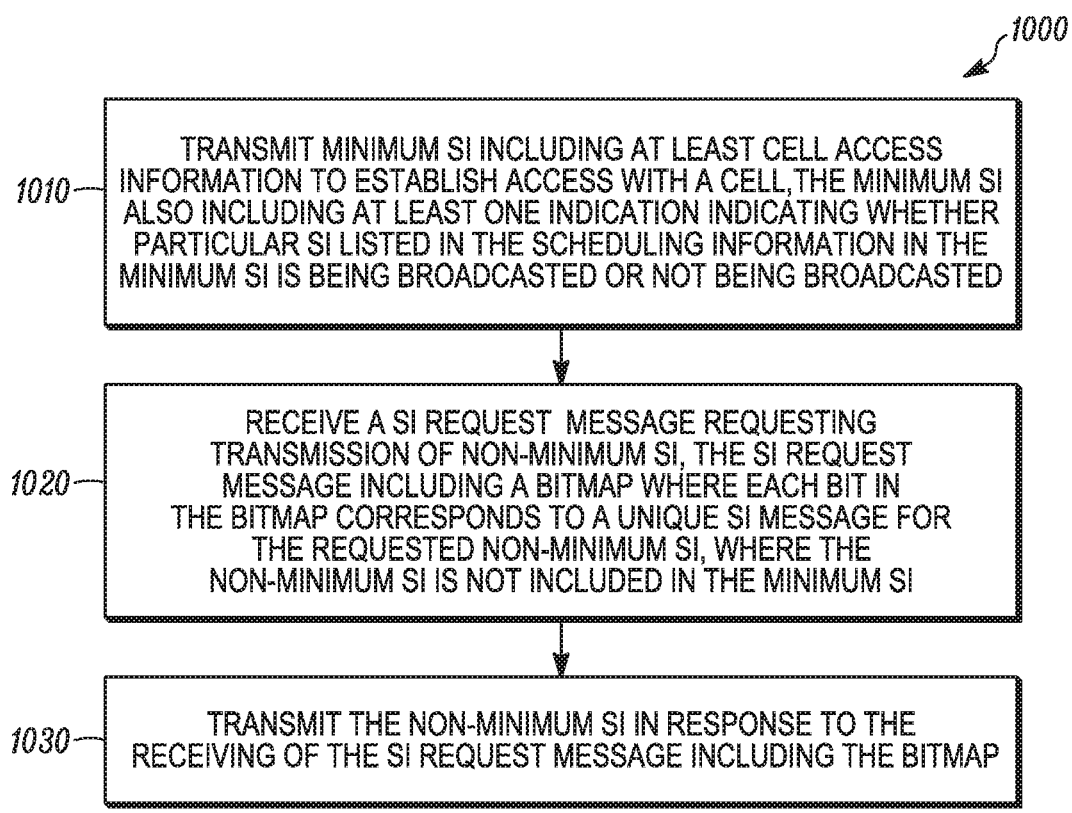
FIG. 10 is another example flowchart illustrating another operation of the network entity, according to a possible embodiment.

FIG. 10 is another example flowchart 1000 illustrating another operation of a network entity, for example the network entity 120, according to a possible embodiment. At 1010, the minimum SI 140 including at least cell access information to establish access with the cell 135 can be transmitted. According to a possible implementation, the minimum SI 140 can also include at least one indication indicating whether particular SI listed in scheduling information in the minimum SI 140 is being broadcasted or not being broadcasted.

At 1020, the SI request message 145 requesting transmission of the non-minimum SI 150 can be received. According to a possible implementation, the SI request message 145 can include a BITMAP where each bit in the BITMAP corresponds to a unique SI message for the requested non-minimum SI 150, where the non-minimum SI 150 is not included in the minimum SI 140. In a possible embodiment, the BITMAP can include the features described above and in 710.

At 1030, the non-minimum SI 150 can be transmitted in response to the receiving of the SI request message 145 including the BITMAP at 1020.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
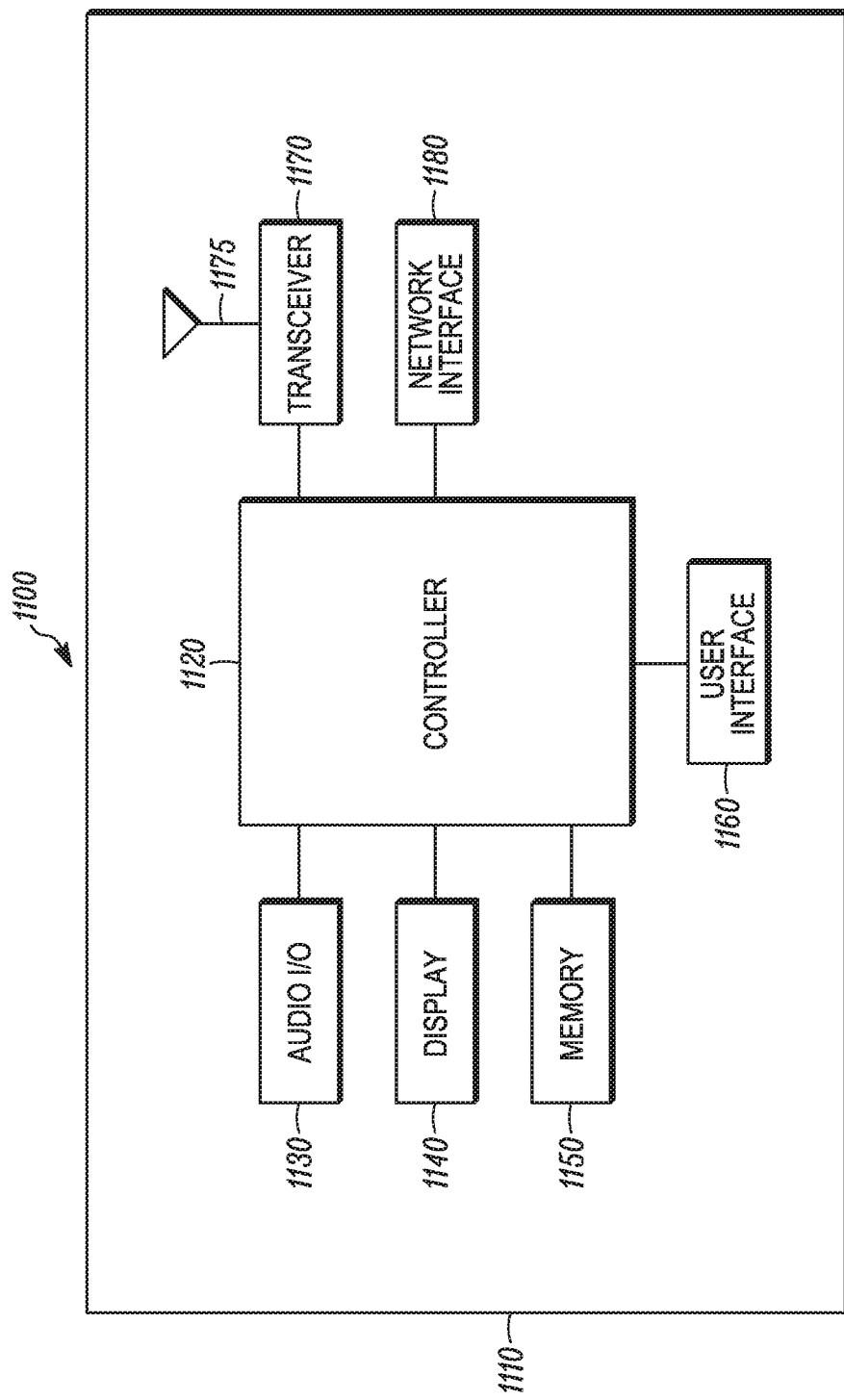
FIG. 11 is an example block diagram of an apparatus, according to a possible embodiment.

FIG. 11 is an example block diagram of an apparatus 1100, such as the UE 110, the network entity 120, the network entity 125, any of the entities within the network 130, and/or any other wireless or non-wireless communication device disclosed herein, according to a possible embodiment. The apparatus 1100 can include a housing 1110, a controller 1120 coupled to the housing 1110, audio input and output circuitry 1130 coupled to the controller 1120, a display 1140 coupled to the controller 1120, a transceiver 1170 coupled to the controller 1120, at least one antenna 1115 coupled to the transceiver 1170, a user interface 1160 coupled to the controller 1120, a memory 1150 coupled to the controller 1120, and a network interface 1180 coupled to the controller 1120. The apparatus 1100 may not necessarily include all of the illustrated elements for different embodiments of the present disclosure. The apparatus 1100 can perform the methods described in all the embodiments.

The display 1140 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1170 can be one or more transceivers that can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1150 can include a Random Access Memory (RAM), a Read Only Memory (RON), an optical memory, a solid state memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1150 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments. Some or all of the additional elements of the apparatus 1100 can also perform some or all of the operations of the disclosed embodiments.

In operation as a UE 110, the transceiver 1170 can transmit and receive the various signals described above. In a possible embodiment, for example the transceiver 1170 can receive the minimum SI 140 including at least cell access information to establish access with the cell 135. The minimum SI can also include at least one indication indicating whether particular SI listed in scheduling information in the minimum SI 140 is being broadcasted or not being broadcasted.

The transceiver 1170 can transmit the SI request message 145 requesting transmission of non-minimum SI 150 to the UE 110 if the at least one indication indicates the non-minimum SI 150 is not being broadcasted. The transceiver 1170 can either in response to the transmission of the SI request message 145 or in response to the at least one indication indicating whether particular SI is being broadcasted receive the requested non-minimum SI 150.

In operation as a network entity, the transceiver 1170 can transmit and receive the various signals described above. In a possible embodiment, for example the transceiver 1170 can transmit the minimum SI 140 including at least cell access information to establish access with a cell of the network entity 120. The minimum SI 140 can also include at least one indication indicating whether particular SI listed in the scheduling information in the minimum SI 140 is being broadcasted or not being broadcasted.

The transceiver 1170 can receive the SI request message 145 requesting transmission of the non-minimum SI 150 to the UE 110. According to a possible implementation, this reception by the network entity 120 can occur if the at least one indication indicates the non-minimum SI 150 is not being broadcasted, where the non-minimum SI 150 is not included in the minimum SI 140.

The transceiver 1170 can transmit the non-minimum SI 150 either in response to the receiving of the SI request message 145 or in response to the at least one indication indicating whether particular SI listed in the scheduling information in the minimum SI 140 is being broadcasted.

In another operation as a UE, the transceiver 1170 can receive the minimum SI 140 including at least cell access information to establish access with a cell of the network entity. The transceiver 1170 can transmit the SI request message 145 requesting transmission of the non-minimum SI 150 to the UE 110 can be transmitted by the UE 110, the SI request message 145 including a BITMAP. According to a possible implementation, each bit in the BITMAP can correspond to a unique SI message for the requested non-minimum SI 150, where the non-minimum SI 150 is not included in the minimum SI 140. The transceiver 1170 can receive the non-minimum SI 150 in response to the transmission of the SI request message including the BITMAP at 920.

In another operation as a network entity, the transceiver 1170 can transmit the minimum SI 140 including at least cell access information to establish access with the cell 135 of the network entity 120. According to a possible implementation, the minimum SI 140 can also include at least one indication indicating whether particular SI listed in scheduling information in the minimum SI 140 is being broadcasted or not being broadcasted.

The transceiver 1170 can receive the SI request message 145 requesting transmission of non-minimum SI 150 to the UE 110. According to a possible implementation, the SI request message 145 including a BITMAP where each bit in the BITMAP corresponds to a unique SI message for the requested non-minimum SI 150, where the non-minimum SI 150 is not included in the minimum SI 140.

The transceiver 1170 can transmit the non-minimum SI 150 in response to the receiving of the SI request message 145 including the BITMAP at 1020.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a device, the method comprising:
   transmitting minimum system information including at least cell access information to establish access with a cell, the minimum system information also including at least one indication indicating whether particular system information listed in scheduling information in the minimum system information is being broadcasted or not being broadcasted;
   receiving a system information request message requesting transmission of non-minimum system information if the at least one indication indicates the non-minimum system information is not being broadcasted, where the non-minimum system information is not included in the minimum system information; and
   transmitting the non-minimum system information in response to the receiving of the system information request message,
   wherein the system information request message comprises a BITMAP, where each bit in the BITMAP that each correspond to a unique system information message for the requested non-minimum system information, and
   wherein a leftmost bit of the BITMAP corresponds to a lowest valued unique system information message type requested, a rightmost bit of the BITMAP corresponds to a highest valued unique system information message type requested, and bits ordered from the leftmost bit to the rightmost bit being ordered in accordance with increased valued minimum information requested.

2. The method according to claim 1, wherein the at least one indication is a Boolean flag.

3. The method according to claim 1, wherein the system information comprises a system information message, where the system information request message is a radio resource control signaling message and comprises a list of one or more of a unique system information message for the requested non-minimum system information.

4. The method according to claim 1, further comprising transmitting particular non-minimum system information until an end of a current modification period in which the particular non-minimum system information is being indicated as being broadcasted.

5. The method according to claim 1, wherein each bit of the BITMAP indicates a different system information message or a different system information block.

6. The method according to claim 1, wherein, each bit in the BITMAP corresponds to particular system information irrespective of if the particular system information is regularly broadcasted or on-demand.

7. The method according to claim 1, wherein each bit in the BITMAP correspond to only particular system information that is indicated as being provided on-demand.

8. The method according to claim 1, wherein each bit in the BITMAP correspond to only particular system information that is indicated as being provided on-demand and not being currently provided.

9. The method according to claim 1, wherein selected bits of the BITMAP indicate system information that is not being broadcast and required.

10. An apparatus, comprising:
a controller configured to control operations of the apparatus; and
a transceiver coupled to the controller, where the transceiver transmits minimum system information including at least cell access information to establish access with a cell, the minimum system information also including at least one indication indicating whether particular system information listed in scheduling information in the minimum system information is being broadcasted or not being broadcasted,
wherein the transceiver receives a system information request message requesting transmission of non-minimum system information if the at least one indication indicates the non-minimum system information is not being broadcasted, where the non-minimum system information is not included in the minimum system information; and
wherein the transceiver transmits the non-minimum system information in response to the receiving of the system information request message,
wherein the system information request message comprises a BITMAP, where each bit in the BITMAP that each correspond to a unique system information message for the requested non-minimum system information, and
wherein a leftmost bit of the BITMAP corresponds to a lowest valued unique system information message type requested, a rightmost bit of the BITMAP corresponds to a highest valued unique system information message type requested, and bits ordered from the leftmost bit to the rightmost bit being ordered in accordance with increased valued minimum information requested.

11. The apparatus according to claim 10, wherein the at least one indication is a Boolean flag.

12. The apparatus according to claim 10, wherein the system information comprises a system information message, where the system information request message is a radio resource control signaling message and comprises a list of one or more of a unique system information message for the requested non-minimum system information.

13. The apparatus according to claim 10, wherein the transceiver further transmits particular non-minimum system information until an end of a current modification period in which the particular non-minimum system information is being indicated as being broadcasted.

14. The apparatus according to claim 10, wherein each bit of the BITMAP indicates a different system information message or a different system information block.

15. The apparatus according to claim 10, wherein, each bit in the BITMAP corresponds to particular system information irrespective of if the particular system information is regularly broadcasted or on-demand.

16. The apparatus according to claim 10, wherein each bit in the BITMAP correspond to only particular system information that is indicated as being provided on-demand.

* * * * *

UNITED STATES PATENT AND TRADEMARK OFFICE
CERTIFICATE OF CORRECTION

PATENT NO. : 11,006,350 B2
APPLICATION NO. : 16/723165
DATED : May 11, 2021
INVENTOR(S) : Basu Mallick et al.

It is certified that error appears in the above-identified patent and that said Letters Patent is hereby corrected as shown below:

In the Claims

Claim 1, Column 14, Line 37: Please replace "minimum" with --non-minimum--

Claim 10, Column 16, Line 4: Please replace "minimum" with --non-minimum--

Signed and Sealed this
Twenty-first Day of February, 2023

Katherine Kelly Vidal
*Director of the United States Patent and Trademark Office*